(12) United States Patent
Kodera

(10) Patent No.: US 11,059,516 B2
(45) Date of Patent: Jul. 13, 2021

(54) STEERING CONTROL APPARATUS

(71) Applicant: JTEKT CORPORATION, Osaka (JP)

(72) Inventor: Takashi Kodera, Okazaki (JP)

(73) Assignee: JTEKT CORPORATION, Osaka (JP)

(*) Notice: Subject to any disclaimer, the term of this patent is extended or adjusted under 35 U.S.C. 154(b) by 314 days.

(21) Appl. No.: 16/251,593

(22) Filed: Jan. 18, 2019

(65) Prior Publication Data

US 2019/0225261 A1 Jul. 25, 2019

(30) Foreign Application Priority Data

Jan. 24, 2018 (JP) .............................. JP2018-009967

(51) Int. Cl.
*B62D 6/00* (2006.01)
*B62D 5/00* (2006.01)
*B62D 5/04* (2006.01)

(52) U.S. Cl.
CPC ............. *B62D 6/008* (2013.01); *B62D 5/006* (2013.01); *B62D 5/0463* (2013.01); *B62D 6/002* (2013.01)

(58) Field of Classification Search
CPC ........ B62D 6/008; B62D 6/002; B62D 5/006; B62D 5/0463
See application file for complete search history.

(56) References Cited

U.S. PATENT DOCUMENTS

| 4,674,588 | A | * | 6/1987 | Yasuda | .................. | B62D 6/008 |
| | | | | | | 180/412 |
| 6,390,229 | B1 | * | 5/2002 | Kaji | ..................... | B62D 5/0463 |
| | | | | | | 180/443 |
| 2007/0114094 | A1 | | 5/2007 | Tamaizumi | | |
| 2008/0183354 | A1 | * | 7/2008 | Higashi | .................. | B62D 15/02 |
| | | | | | | 701/43 |

(Continued)

FOREIGN PATENT DOCUMENTS

| EP | 3 210 851 A2 | 8/2017 |
| FR | 2 994 413 A1 | 2/2014 |

(Continued)

OTHER PUBLICATIONS

Jun. 14, 2019 Extended European Search Report issued in European Patent Application No. 19153455.1.

(Continued)

*Primary Examiner* — Minnah L Seoh
*Assistant Examiner* — Marlon A Arce
(74) *Attorney, Agent, or Firm* — Oliff PLC

(57) ABSTRACT

Provided is a steering control apparatus capable of performing adjustment so as to suppress deterioration in a steering feel that is caused by a twist of a torsion bar. A torsional stiffness control circuit includes a torsion angle calculation circuit, a gain calculation circuit, multiplication circuits, and an addition circuit. The torsion angle calculation circuit calculates a torsion angle based on a steering torque. The gain calculation circuit calculates a gain having a positive or (Continued)

negative value based on a value obtained by multiplying the steering torque and a steering speed together by the multiplication circuit. The multiplication circuit calculates a compensation amount by multiplying the torsion angle and the gain together. The addition circuit calculates a target pinion angle having a compensated phase by adding the compensation amount to a target steering angle.

6 Claims, 7 Drawing Sheets

(56) References Cited

U.S. PATENT DOCUMENTS

| | | | |
|---|---|---|---|
| 2014/0343794 A1 | 11/2014 | Tamaizumi et al. | |
| 2016/0272237 A1* | 9/2016 | Kawamura | B62D 5/04 |
| 2017/0247051 A1 | 8/2017 | Matsuo et al. | |
| 2017/0253265 A1* | 9/2017 | Nishimura | B62D 15/025 |
| 2019/0225261 A1* | 7/2019 | Kodera | B62D 6/002 |
| 2020/0395882 A1* | 12/2020 | Takase | H02P 6/10 |

FOREIGN PATENT DOCUMENTS

| | | |
|---|---|---|
| JP | 2007-083827 A | 4/2007 |
| JP | 2010-274822 A | 12/2010 |
| JP | 2013-018354 A | 1/2013 |
| WO | 2017/213119 A1 | 12/2017 |

OTHER PUBLICATIONS

Nov. 6, 2019 Office Action issued in European Patent Application No. 19153455.1.

* cited by examiner

STEERING CONTROL APPARATUS

INCORPORATION BY REFERENCE

The disclosure of Japanese Patent Application No. 2018-009967 filed on Jan. 24, 2018 including the specification, drawings and abstract, is incorporated herein by reference in its entirety.

BACKGROUND OF THE INVENTION

1. Field of the Invention

The present invention relates to a steering control apparatus.

2. Description of the Related Art

Hitherto, there is known a steering system configured to vary an angle relationship between a part of a steering shaft on a steering wheel side and a part of the steering shaft on a steered wheel side (for example, Japanese Patent Application Publication No. 2013-18354 (JP 2013-18354 A)). JP 2013-18354 A describes a variable steering angle ratio steering system configured to change a steering angle ratio that is a ratio between a steering angle of the steering wheel and a steered angle of each of the steered wheels while transmitting, toward the steered wheels, a steering torque applied to the steering shaft. The part of the steering shaft on the steering wheel side is provided with a torque sensor configured to detect the steering torque based on a torsion angle of a torsion bar provided at the part of the steering shaft on the steering wheel side.

In the steering system described in JP 2013-18354 A, when the steering wheel is steered, the phase of the steered angle of each of the steered wheels is delayed relative to the steering operation for the steering wheel by an amount corresponding to a twist of the torsion bar. In a steering control apparatus of the steering system, the phase of a steered angle command value (control target value for a variable steering angle ratio motor) that is a target value of the steered angle is advanced relative to the steering operation for the steering wheel by an amount corresponding to a compensation component determined based on the torsion angle of the torsion bar.

For example, during a returning operation for the steering wheel, the phase of the steered angle command value may be delayed relative to the steering operation for the steering wheel even if the phase of the steered angle command value is advanced by the amount corresponding to the compensation component determined based on the torsion angle of the torsion bar. Due to the twist of the torsion bar, the motor to be controlled by the steering control apparatus may be delayed relative to the steering operation for the steering wheel. Thus, the steering feel of the steering system is deteriorated.

This phenomenon may similarly occur in a steer-by-wire type steering system configured to detect a steering torque based on a twisted state of a torsion bar when a steering wheel is steered.

SUMMARY OF THE INVENTION

It is one object of the present invention to provide a steering control apparatus capable of performing adjustment so as to suppress deterioration in a steering feel that is caused by a twist of a torsion bar.

One aspect of the present invention relates to a steering control apparatus configured to control a steering system including a steering apparatus, a steering operation apparatus, an angle varying apparatus, a torque sensor, and a motor. The steering apparatus includes a steering wheel to be steered by a driver. The steering operation apparatus is configured to turn a steered wheel in response to a steering operation for the steering wheel by the driver. The angle varying apparatus couples a part of a steering shaft on the steering apparatus side and a part of the steering shaft on the steering operation apparatus side and is configured to vary an angle relationship between the part on the steering apparatus side and the part on the steering operation apparatus side. The steering shaft is provided over the steering apparatus and the steering operation apparatus. The torque sensor is configured to detect a steering torque based on a torsion amount of a torsion bar provided at the part of the steering shaft on the steering apparatus side. The motor is connected to the steering operation apparatus and is configured to turn the steered wheel based on the steering torque.

The steering control apparatus includes a command value calculation circuit and a compensation circuit. The command value calculation circuit is configured to calculate a command value for driving the motor in response to the steering operation for the steering wheel. The compensation circuit is configured to compensate the command value so as to change a phase of the command value relative to the steering operation for the steering wheel based on power generated to twist the torsion bar through the steering operation for the steering wheel.

According to this configuration, when the driver steers the steering wheel, the compensation is performed so as to change the phase of the command value based on the power generated to twist the torsion bar through the steering operation for the steering wheel. Through the compensation of the command value, an apparent torsional stiffness of the torsion bar can be made variable. Thus, it is possible to perform various adjustments involving reducing, maintaining, or increasing a delay in control of the motor that is caused by the twist of the torsion bar when the driver turns or returns the steering wheel. Through this adjustment, adjustment can be performed so as to suppress the deterioration in the steering feel that is caused by the twist of the torsion bar.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A steering control apparatus according to a first embodiment of the present invention that is applied to a steer-by-wire type steering system is described below.

Figure 1:
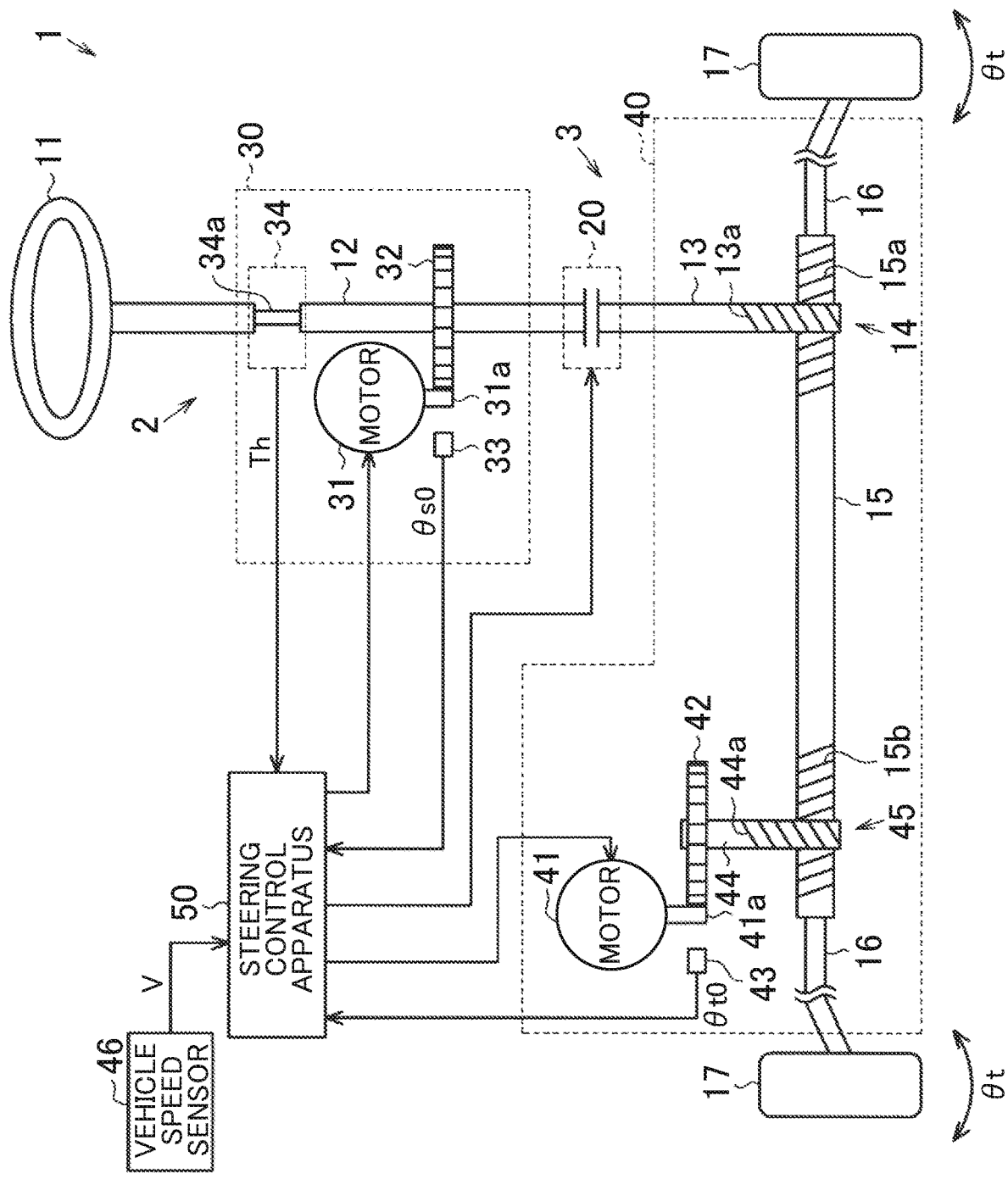
FIG. 1 is a schematic configuration diagram of a steer-by-wire type steering system of a first embodiment.

As illustrated in FIG. 1, a steering system 1 for a vehicle includes a steering apparatus 2, a steering operation apparatus 3, and a clutch 20. The steering apparatus 2 is steered by a driver. The steering operation apparatus 3 turns steered wheels 17 and 17 in response to the driver's steering operation for the steering apparatus 2. The clutch 20 is capable of connecting or disconnecting the steering apparatus 2 and the steering operation apparatus 3.

The steering apparatus 2 includes a steering wheel 11 and a steering shaft 12. The steering shaft 12 is coupled to the steering wheel 11. The steering operation apparatus 3 includes a pinion shaft 13, a first rack and pinion mechanism 14, a steering operation shaft 15, tie rods 16 and 16, and the steered wheels 17 and 17. The pinion shaft 13 is a part of the steering shaft 12 that is opposite to the steering wheel 11 with respect to the clutch 20. The lower end of the pinion shaft 13 is coupled to the steering operation shaft 15 via the first rack and pinion mechanism 14. The steering operation shaft 15 extends in a direction intersecting the pinion shaft 13. The first rack and pinion mechanism 14 is constructed such that pinion teeth 13a of the pinion shaft 13 mesh with rack teeth 15a of the steering operation shaft 15. Ends of the steering operation shaft 15 are coupled to the right and left steered wheels 17 and 17 via the tie rods 16 and 16, respectively. The steering shaft 12, the pinion shaft 13, and the steering operation shaft 15 function as a path for transmitting power between the steering wheel 11 and the steered wheels 17 and 17.

The clutch 20 that functions as an angle varying apparatus is provided on the steering shaft 12. The clutch 20 connects or disconnects a part of the steering shaft 12 that is closer to the steering wheel 11 with respect to the clutch 20 and a part of the steering shaft 12 that is opposite to the steering wheel 11 with respect to the clutch 20, thereby varying an angle relationship between those parts. Examples of the clutch 20 to be employed include an electromagnetic clutch configured to perform connection or disconnection (switch a connected state and a disconnected state) by energizing an exciting coil. When the exciting coil is energized, the clutch 20 is brought into the disconnected state. When the exciting coil is not energized, the clutch 20 is brought into the connected state. When the clutch 20 is disconnected, the power transmission between the steering wheel 11 and the steered wheels 17 and 17 is disconnected. When the clutch 20 is connected, the power transmission between the steering wheel 11 and the steered wheels 17 and 17 is connected. Thus, when the clutch 20 is in the connected state, rotational motion of the steering shaft 12 is converted to reciprocating linear motion of the steering operation shaft 15 in its axial direction (lateral direction in FIG. 1) via the first rack and pinion mechanism 14.

The steering system 1 includes a reaction unit 30 as a structure for generating a steering reaction force. The steering reaction force is a force to be applied in a direction opposite to a direction of a driver's operation for the steering wheel 11. By applying the steering reaction force to the steering wheel 11 (steering shaft 12), the driver can acquire appropriate tactile feedback.

The reaction unit 30 includes a reaction motor 31, a speed reducing mechanism 32, a rotation angle sensor 33, and a torque sensor 34. The reaction motor 31 is a source of the steering reaction force. Examples of the reaction motor 31 to be employed include a three-phase brushless motor. A rotation shaft 31a of the reaction motor 31 is coupled to the steering shaft 12 via the speed reducing mechanism 32. The speed reducing mechanism 32 is provided at the part of the steering shaft 12 that is closer to the steering wheel 11 with respect to the clutch 20. The steering reaction force is applied to the steering wheel 11 by applying a motor torque of the reaction motor 31 to the steering shaft 12.

The rotation angle sensor 33 detects a rotation angle $\theta s0$ of the rotation shaft 31a of the reaction motor 31. The rotation angle $\theta s0$ of the reaction motor 31 is used for calculating a steering angle. The reaction motor 31 and the steering shaft 12 operate in association with each other via the speed reducing mechanism 32. The rotation angle $\theta s0$ of the reaction motor 31 is correlated to a rotation angle of the steering shaft 12. The rotation angle of the steering shaft 12 is correlated to the steering angle of the steering wheel 11. Therefore, the steering angle can be determined based on the rotation angle $\theta s0$ detected by the rotation angle sensor 33.

The steering system 1 includes a steering operation unit 40 as a structure for generating a steering operation force. The steering operation force is a force for turning the steered wheels 17 and 17.

The steering operation unit 40 includes a steering operation motor 41, a speed reducing mechanism 42, and a rotation angle sensor 43. The steering operation motor 41 is a source of the steering operation force. Examples of the steering operation motor 41 to be employed include a three-phase brushless motor. A rotation shaft 41a of the steering operation motor 41 is coupled to a pinion shaft 44 via the speed reducing mechanism 42. The lower end of the pinion shaft 44 is coupled to the steering operation shaft 15 via a second rack and pinion mechanism 45. The steering operation shaft 15 extends in a direction intersecting the pinion shaft 44. The second rack and pinion mechanism 45 is constructed such that pinion teeth 44a of the pinion shaft 44 mesh with rack teeth 15b of the steering operation shaft 15. The pinion shaft 44 is rotated by applying a torque of the steering operation motor 41 to the pinion shaft 44. The rotational motion of the pinion shaft 44 is converted to reciprocating linear motion of the steering operation shaft 15 in its axial direction via the second rack and pinion mechanism 45. Thus, the torque of the steering operation motor 41 is applied to the steering operation shaft 15 via the pinion shaft 44 as the steering operation force. The steering operation unit 40, the pinion shaft 44, and the second rack and pinion mechanism 45 are components of the steering operation apparatus 3.

The rotation angle sensor 43 detects a rotation angle $\theta t0$ of the rotation shaft 41a of the steering operation motor 41. The rotation angle $\theta t0$ of the steering operation motor 41 is used for calculating a steered angle $\theta t$. The steering operation motor 41 and the pinion shaft 44 operate in association with each other via the speed reducing mechanism 42. Therefore, the rotation angle $\theta t0$ of the steering operation motor 41 is correlated to a rotation angle of the pinion shaft 44. The rotation angle of the pinion shaft 44 is correlated to a rotation angle of the pinion shaft 13. The rotation angle of the pinion shaft 44 (pinion angle $\theta p$) is also correlated to the steered angle $\theta t$ of each of the steered wheels 17 and 17. Therefore, the steered angle $\theta t$ can be determined based on the rotation angle $\theta t0$ detected by the rotation angle sensor 43. The rotation angle $\theta s0$, the rotation angle $\theta t0$, the pinion angle θp, and the steered angle θt have positive values when the steering wheel 11 is steered in a first direction (rightward direction in this embodiment), and negative values when the steering wheel 11 is steered in a second direction (leftward direction in this embodiment).

The steering system 1 includes a steering control apparatus 50. The steering control apparatus 50 controls the reaction motor 31, the steering operation motor 41, and the clutch 20 based on detection results from various sensors. The rotation angle sensor 33, the torque sensor 34, the rotation angle sensor 43, and a vehicle speed sensor 46 are used as various sensors. The torque sensor 34 detects a steering torque Th applied to the steering shaft 12 through a rotational operation for the steering wheel 11.

The torque sensor 34 has a torsion bar 34a provided at some midpoint along the steering shaft 12. The torque sensor 34 detects the steering torque Th based on a torsion angle between a part of the steering shaft 12 that is closer to the steering wheel 11 (upper side in FIG. 1) with respect to the torsion bar 34a and a part of the steering shaft 12 that is opposite to the steering wheel 11 (lower side in FIG. 1) with respect to the torsion bar 34a. The vehicle speed sensor 46 is provided in the vehicle as a traveling detection circuit configured to detect a traveling condition of the vehicle. The vehicle speed sensor 46 detects a vehicle speed V that is a traveling speed of the vehicle. During a turning operation in the rightward direction with respect to a neutral position of the steering wheel 11 (θs=0), both the steering torque Th and the steering angle θs increase on a positive side, and a steering speed ω that is a derivative of the steering angle θs is positive. During a turning operation in the leftward direction, both the steering torque Th and the steering angle θs increase on a negative side, and therefore the steering speed ω is negative.

The steering control apparatus 50 switches connection and disconnection of the clutch 20 based on whether conditions for connecting the clutch 20 are satisfied. When the clutch 20 is in the disconnected state, the steering control apparatus 50 causes the steering system 1 to function as a steer-by-wire type steering system by executing reaction control for generating a steering reaction force in the steering wheel 11 through control of the reaction motor 31 and executing steering operation control for turning the steered wheels 17 and 17 through control of the steering operation motor 41. Thus, the steering operation shaft 15 performs linear motion along with a rotational operation for the steering wheel 11, thereby changing the steered angle θt of each of the steered wheels 17 and 17.

The steering control apparatus 50 calculates a target steering reaction force for generating a steering reaction force based on the steering torque Th and the vehicle speed V. The steering control apparatus 50 calculates a target steering angle based on the calculated target steering reaction force and the steering torque Th. The steering control apparatus 50 calculates a steering angle correction amount by executing angle feedback control for the steering angle so that an actual steering angle follows the target steering angle, and calculates a steering reaction force command value by adding the steering angle correction amount to the target steering reaction force. The steering control apparatus 50 controls power supply to the reaction motor 31 based on a current necessary to generate a steering reaction force determined based on the steering reaction force command value.

The steering control apparatus 50 calculates a pinion angle that is an actual rotation angle of the pinion shaft 44 based on the rotation angle θt0 detected by the rotation angle sensor 43. The pinion angle is a value that reflects the steered angle θt of each of the steered wheels 17 and 17. The steering control apparatus 50 calculates a target pinion angle by using the target steering angle. The steering control apparatus 50 controls power supply to the steering operation motor 41 based on a deviation between the target pinion angle and the actual pinion angle by executing angle feedback control so as to eliminate the deviation.

Figure 2:
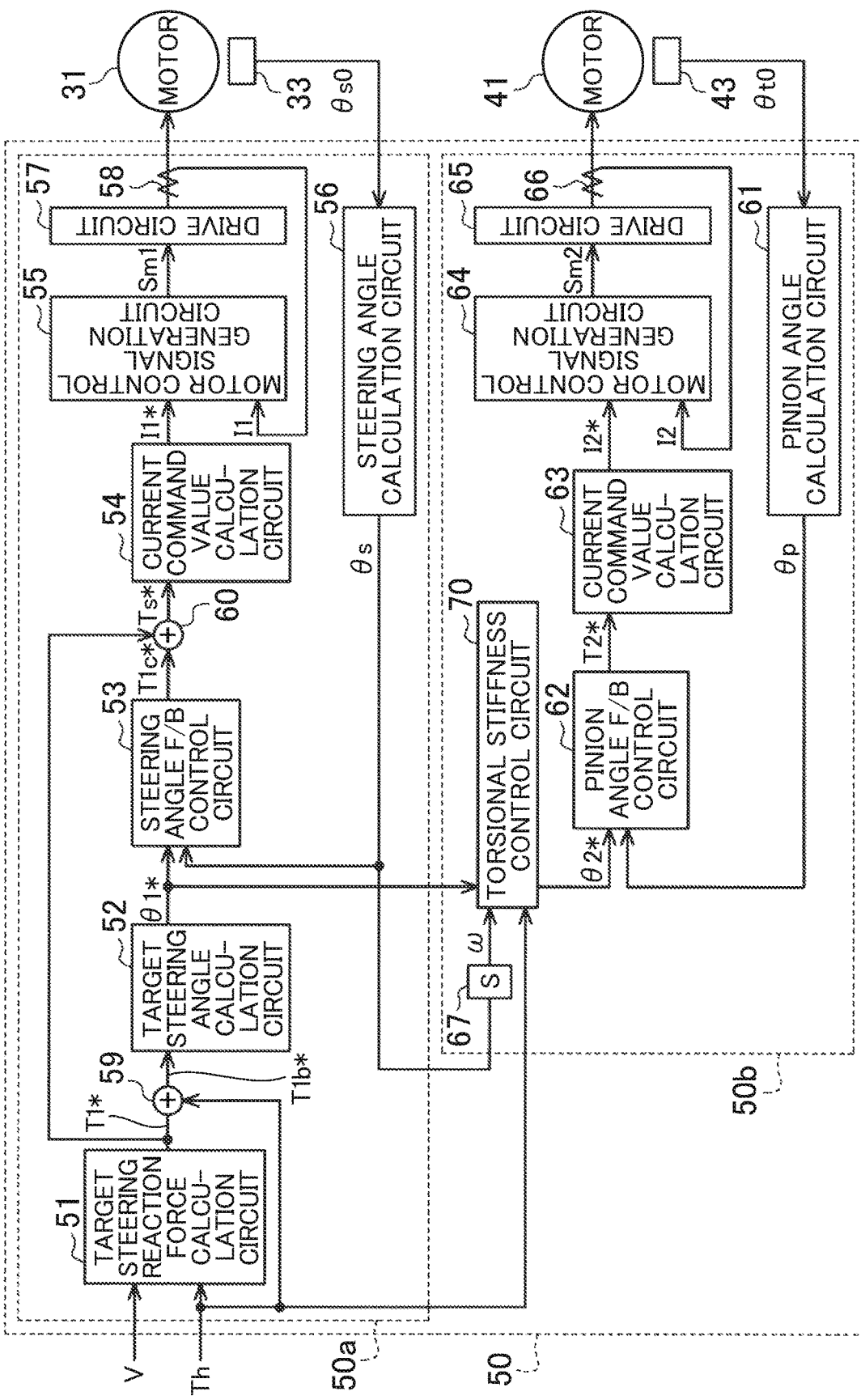
FIG. 2 is a control block diagram of a steering control apparatus of the first embodiment.

The configuration of the steering control apparatus 50 is described. As illustrated in FIG. 2, the steering control apparatus 50 includes a reaction control circuit 50a configured to execute the reaction control, and a steering operation control circuit 50b configured to execute the steering operation control.

The reaction control circuit 50a includes a target steering reaction force calculation circuit 51, a target steering angle calculation circuit 52, a steering angle feedback control circuit 53, a current command value calculation circuit 54, a motor control signal generation circuit 55, a steering angle calculation circuit 56, a drive circuit 57, a current sensor 58, and addition circuits 59 and 60.

The target steering reaction force calculation circuit 51 calculates a target steering reaction force T1* based on the steering torque Th detected by the torque sensor 34 and the vehicle speed V detected by the vehicle speed sensor 46. The target steering reaction force T1* is a target value of the steering reaction force that is a force acting against the rotation of the steering wheel 11.

The target steering angle calculation circuit 52 calculates a target steering angle θ1* of the steering wheel 11 based on a basic drive torque T1b* obtained through the addition circuit 59. The basic drive torque T1b* is a value obtained by adding the target steering reaction force T1* and the steering torque Th together. The target steering angle calculation circuit 52 has an ideal model that defines an ideal steering angle based on the basic drive torque T1b* calculated by the addition circuit 59. The ideal model is obtained by modeling a steering angle corresponding to an ideal steered angle based on the basic drive torque T1b* through an experiment or the like in advance. The target steering angle calculation circuit 52 calculates the target steering angle θ1* from the basic drive torque T1b* based on the ideal model.

The steering angle calculation circuit 56 calculates the actual steering angle θs of the steering wheel 11 based on the rotation angle θs0 of the reaction motor 31 that is detected by the rotation angle sensor 33. The steering angle feedback control circuit 53 calculates a steering angle correction amount T1c* through feedback control of the steering angle θs so that the actual steering angle θs of the steering wheel 11 follows the target steering angle θ1*.

The addition circuit 60 calculates a steering reaction force command value Ts* by adding the steering angle correction amount T1c* to the target steering reaction force T1*. The current command value calculation circuit 54 calculates a current command value I1* that is a target value of a drive current of the reaction motor 31 based on the steering reaction force command value Ts*.

The motor control signal generation circuit 55 acquires an actual current value I1 through the current sensor 58 provided in a power supply path to the reaction motor 31. The actual current value I1 is a value of a current actually supplied to the reaction motor 31. The motor control signal generation circuit 55 generates a motor control signal Sm1 by executing current feedback control so that the actual current value I1 follows the current command value I1*. The motor control signal generation circuit 55 controls the power supply to the reaction motor 31 so as to eliminate a deviation between the current command value I1* and the actual current value I1. Thus, the reaction motor 31 can generate a torque determined based on the steering reaction force command value Ts*.

The drive circuit 57 is a three-phase (U-phase, V-phase, and W-phase) drive circuit. The drive circuit 57 turns ON or OFF switching elements that constitute the drive circuit 57 based on the motor control signal Sm1, thereby converting direct current (DC) power supplied from a battery (not illustrated) to three-phase alternating current (AC) power. The drive circuit 57 supplies the three-phase AC power to the reaction motor 31.

As illustrated in FIG. 2, the steering operation control circuit 50b includes a torsional stiffness control circuit 70 serving as a compensation circuit, a pinion angle calculation circuit 61, a pinion angle feedback control circuit 62, a current command value calculation circuit 63, a motor control signal generation circuit 64, a drive circuit 65, a current sensor 66, and a differentiation circuit 67.

The torsional stiffness control circuit 70 calculates a target pinion angle θ2* (target steered angle) that is a target value of the pinion angle θp of the pinion shaft 44 by compensating the phase of the target steering angle θ1* calculated by the target steering angle calculation circuit 52 of the reaction control circuit 50a. Specifically, the torsional stiffness control circuit 70 acquires the target steering angle θ1* calculated by the target steering angle calculation circuit 52, the steering speed ω that is a value obtained by differentiating, by the differentiation circuit 67, the steering angle θs calculated by the steering angle calculation circuit 56, and the steering torque Th detected by the torque sensor 34. The torsional stiffness control circuit 70 calculates the target pinion angle θ2* by advancing or delaying the phase of the target steering angle θ1* relative to the steering operation for the steering wheel 11 based on the target steering angle θ1*, the steering speed ω, and the steering torque Th.

The pinion angle calculation circuit 61 calculates the pinion angle θp that is an actual rotation angle of the pinion shaft 44 based on the rotation angle θt0 of the steering operation motor 41 that is detected by the rotation angle sensor 43. The pinion angle calculation circuit 61 functions as a follow angle calculation circuit configured to calculate the pinion angle θp as a follow angle that follows the target steering angle θ1* serving as an angle command value.

The pinion angle feedback control circuit 62 calculates a pinion angle command value T2* through feedback control (for example, proportional-integral-derivative (PID) control) of the pinion angle θp so that the actual pinion angle θp follows the target pinion angle θ2*.

The current command value calculation circuit 63 calculates a current command value I2* that is a target value of a drive current of the steering operation motor 41 based on the pinion angle command value T2*. The pinion angle feedback control circuit 62 and the current command value calculation circuit 63 function as an angle feedback control circuit.

The current sensor 66 is provided in a power supply path to the steering operation motor 41. The current sensor 66 detects an actual current value I2 that is a value of a current actually supplied to the steering operation motor 41. The motor control signal generation circuit 64 acquires the actual current value I2 detected by the current sensor 66. The motor control signal generation circuit 64 generates a motor control signal Sm2 by executing current feedback control so that the actual current value I2 follows the current command value I2*. The motor control signal generation circuit 64 controls the power supply to the steering operation motor 41 so as to eliminate a deviation between the current command value I2* and the actual current value I2. Thus, the steering operation motor 41 can generate a torque determined based on the pinion angle command value T2*.

The drive circuit 65 is a three-phase (U-phase, V-phase, and W-phase) drive circuit. The drive circuit 65 turns ON or OFF switching elements that constitute the drive circuit 65 based on the motor control signal Sm2, thereby converting the DC power supplied from the battery (not illustrated) to three-phase AC power. The drive circuit 65 supplies the three-phase AC power to the steering operation motor 41.

Figure 3:
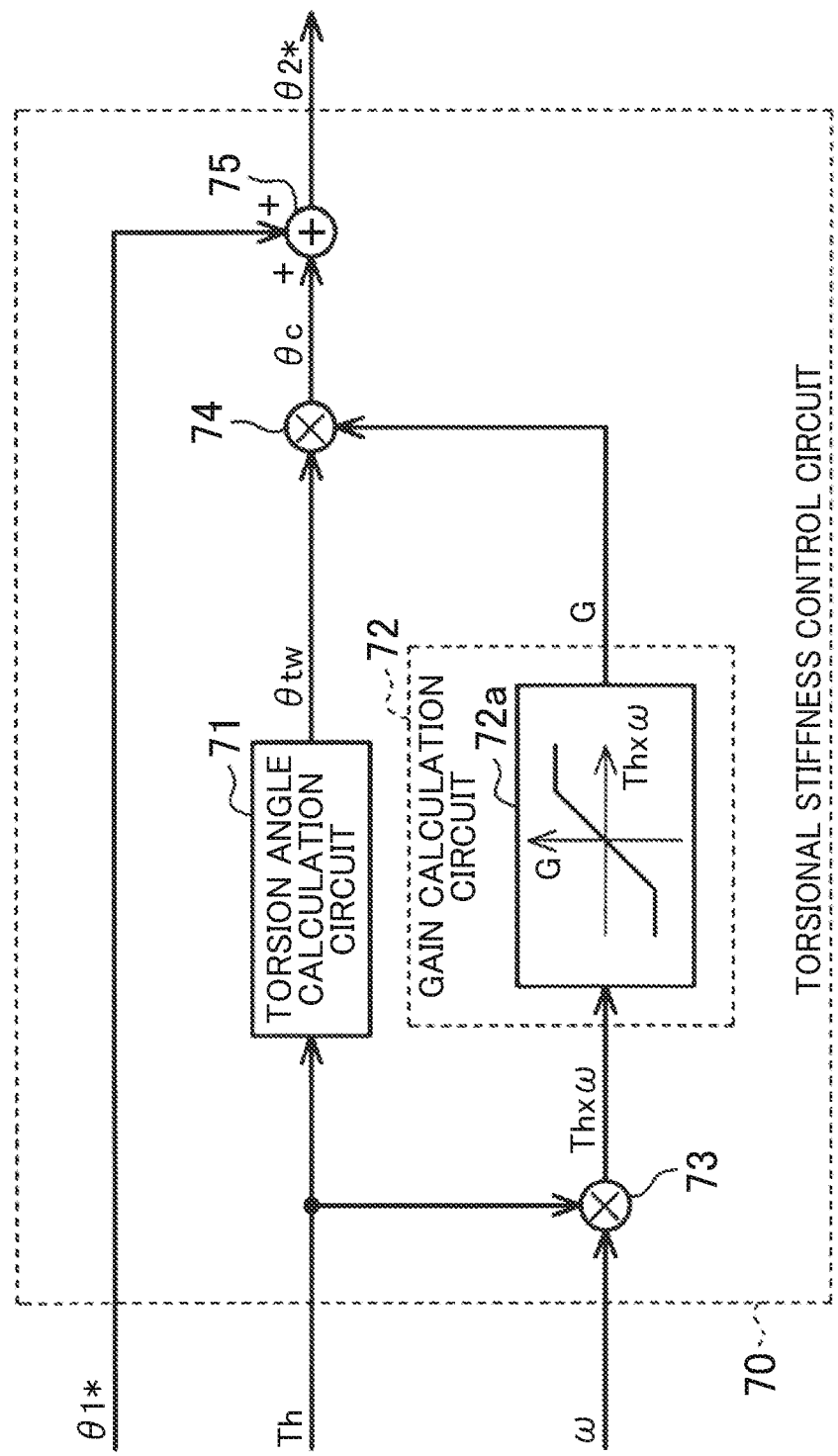
FIG. 3 is a control block diagram of a torsional stiffness control circuit of the first embodiment.

The configuration of the torsional stiffness control circuit 70 is described. As illustrated in FIG. 3, the torsional stiffness control circuit 70 includes a torsion angle calculation circuit 71, a gain calculation circuit 72, multiplication circuits 73 and 74, and an addition circuit 75.

The torsion angle calculation circuit 71 calculates, based on the steering torque Th detected by the torque sensor 34, a torsion angle θtw between the part of the steering shaft 12 that is closer to the steering wheel 11 with respect to the torsion bar 34a and the part of the steering shaft 12 that is opposite to the steering wheel 11 with respect to the torsion bar 34a. Specifically, the torsion angle calculation circuit 71 calculates the torsion angle θtw by multiplying the steering torque Th by a coefficient such as an inverse of a spring rate of the torsion bar 34a.

The gain calculation circuit 72 includes a basic gain calculation circuit 72a configured to calculate a gain G based on a value obtained by multiplying the steering torque Th and the steering speed ω together by the multiplication circuit 73. The value obtained by multiplying the steering speed ω and the steering torque Th together is a value related to power generated to twist the torsion bar 34a when the steering wheel 11 is steered. The value obtained by multiplying the steering torque Th and the steering speed ω together is positive when the steering wheel 11 is turned. The value obtained by multiplying the steering torque Th and the steering speed ω together is negative when the steering wheel 11 is returned. The multiplication circuit 73 functions as a calculation circuit configured to calculate the value related to the power generated when the steering wheel 11 is steered.

The multiplication circuit 74 calculates a compensation amount θc by multiplying together the torsion angle θtw calculated by the torsion angle calculation circuit 71 and the gain G calculated by the gain calculation circuit 72. The addition circuit 75 calculates the target pinion angle θ2* having a compensated phase by adding the compensation amount θc calculated by the multiplication circuit 74 to the target steering angle θ1* calculated by the target steering angle calculation circuit 52.

Figure 4:
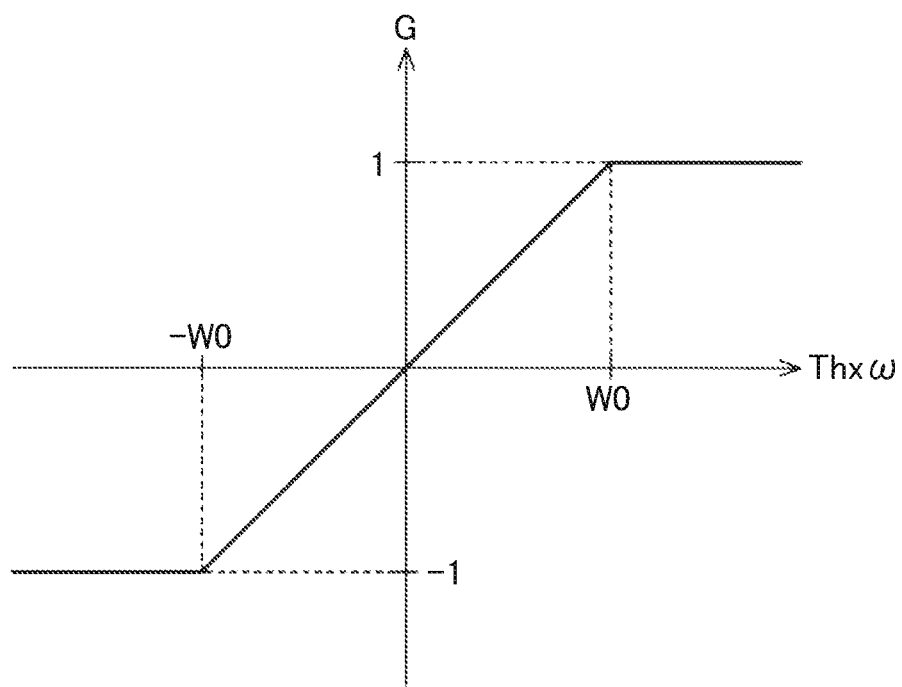
FIG. 4 is a graph illustrating a relationship between a gain and a value obtained by multiplying a steering torque and a steering speed together.

Specifically, as illustrated in FIG. 4, the basic gain calculation circuit 72a sets the gain G to "1" when the value obtained by multiplying the steering torque Th and the steering speed ω together is larger than a threshold W0, and sets the gain G to "−1" when the value obtained by multiplying the steering torque Th and the steering speed ω together is smaller than a threshold −W0. The threshold W0 and the threshold −W0 are set based on a value obtained by multiplying the steering torque Th and the steering speed ω together when the steering condition of the steering wheel 11 is being switched between the turning operation and the returning operation. When the gain G is "1" and also when the gain G is "−1", the phase of the target pinion angle θ2* can be advanced relative to the steering operation for the steering wheel 11 by an amount corresponding to the torsion angle θtw.

When the value obtained by multiplying the steering torque Th and the steering speed ω together is present between the threshold W0 and the threshold −W0, the basic gain calculation circuit 72a calculates a gain G having a value closer to "1" as the value obtained by multiplying the steering torque Th and the steering speed ω together approaches the threshold W0, and calculates a gain G having a value closer to "−1" as the value obtained by multiplying the steering torque Th and the steering speed ω together approaches the threshold −W0. The value obtained by multiplying the steering torque Th and the steering speed ω together is present between the threshold W0 and the threshold −W0 in a situation in which the steering condition of the steering wheel 11 is switched between the turning operation and the returning operation. When the steering condition of the steering wheel 11 is switched between the turning operation and the returning operation, the phase of the target steering angle θ1* is advanced by the amount corresponding to the torsion angle θtw relative to a direction of compensation of the phase of the target steering angle θ1*, that is, the steering operation for the steering wheel 11. By changing the gain G depending on the value obtained by multiplying the steering torque Th and the steering speed ω together, the target pinion angle θ2* having a compensated phase can be changed smoothly even if the steering condition of the steering wheel 11 is switched between the turning operation and the returning operation.

Actions and effects of this embodiment are described.

(1) When the driver steers the steering wheel 11, the steering torque Th is detected based on a twisted state of the torsion bar 34a. Therefore, the steering operation control executed through the steering operation motor 41 based on the steering torque Th is delayed relative to the steering operation for the steering wheel 11 by an amount corresponding to the twist of the torsion bar 34a. As a result, the phase of the steered angle θt of each of the steered wheels 17 and 17 is delayed relative to the steering operation for the steering wheel 11. Thus, there is a possibility that the response of turning of the steered wheels 17 and 17 to the steering operation for the steering wheel 11 cannot be satisfied.

As a comparative example, it is conceivable that a compensation component determined based on the twist of the torsion bar 34a is constantly added to the steered angle θt of each of the steered wheels 17 and 17 (for example, a command value for the steered angle) in relation to the steering operation for the steering wheel 11. For example, in a situation in which the torsion bar 34a is twisted by turning the steering wheel 11 in a certain direction and the steering wheel 11 is returned in a direction opposite to the twisting direction, however, the delay in the phase of the steered angle θt cannot be compensated appropriately even if the compensation component is added to the steered angle θt in relation to the steering operation for the steering wheel 11.

In this embodiment, the compensation is performed so as to change the phase of the target pinion angle θ2* based on the value obtained by multiplying the steering torque Th and the steering speed ω of the steering wheel 11 together, that is, the power generated to twist the torsion bar 34a through the steering operation for the steering wheel 11. Through the compensation of the target pinion angle θ2*, an apparent torsional stiffness of the torsion bar 34a can be made variable. Thus, the phase of the target pinion angle θ2* can be advanced relative to the steering operation for the steering wheel 11 by the compensation amount θc based on the steering condition of the steering wheel 11 that is determined based on the power generated to twist the torsion bar 34a through the steering operation for the steering wheel 11. Accordingly, it is possible to more appropriately adjust the delay in the control of the steering operation motor 41 that is caused by the twist of the torsion bar 34a when the driver turns or returns the steering wheel 11. Through this adjustment, adjustment can be performed so as to suppress deterioration in a steering feel that is caused by the twist of the torsion bar 34a.

(2) The value obtained by multiplying the steering torque Th and the steering speed ω of the steering wheel 11 together, that is, the power generated to twist the torsion bar 34a through the steering operation for the steering wheel 11 is a value affected by the steering condition of the steering wheel 11. Therefore, the steering condition of the steering wheel 11 can be determined appropriately based on the power generated to twist the torsion bar 34a through the steering operation for the steering wheel 11.

Figure 5:
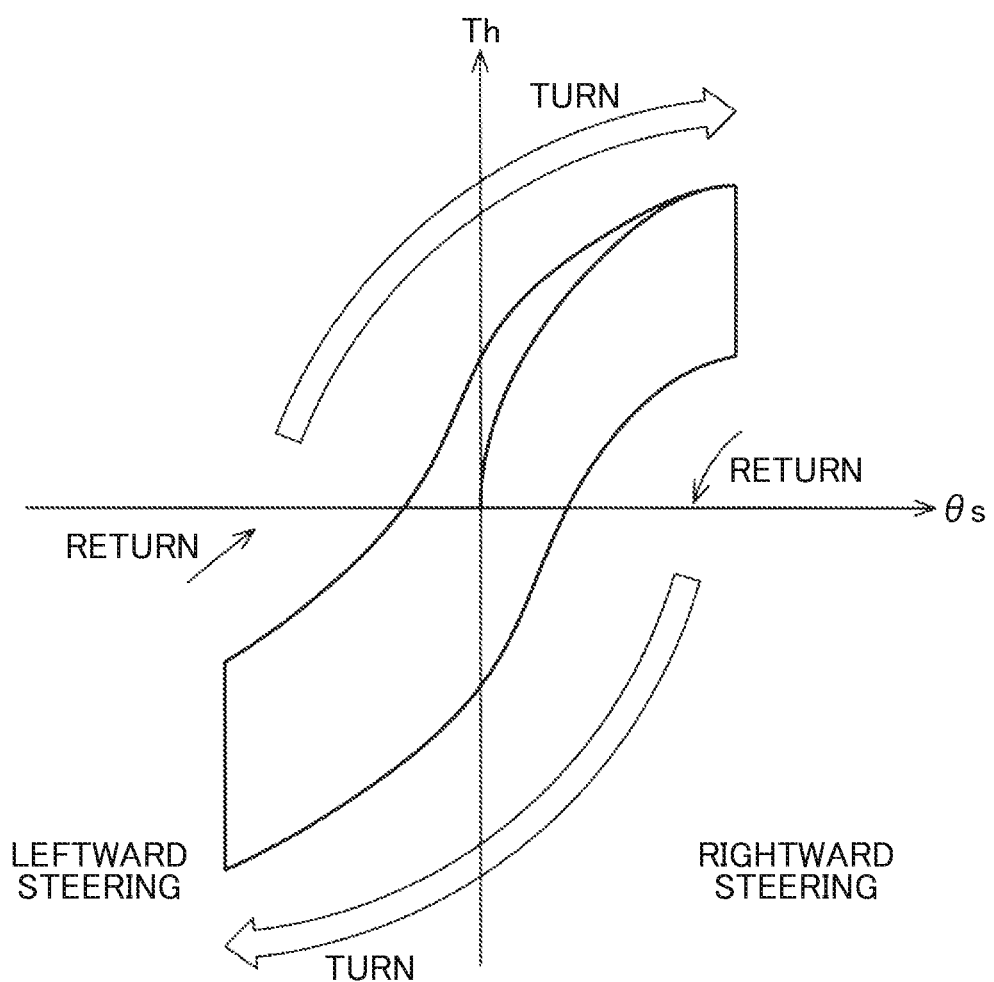
FIG. 5 is a graph illustrating a relationship between a steering angle and the steering torque during a turning operation and a returning operation.

Referring to FIG. 5, description is given of a relationship between the steering condition of the steering wheel 11 and the power generated to twist the torsion bar 34a through the steering operation for the steering wheel 11.

During the turning operation in the rightward direction with respect to the neutral position of the steering wheel 11 (θs=0), both the steering torque Th and the steering angle θs increase on the positive side. That is, during the turning operation in the rightward direction, there is a tendency that the steering torque Th is positive and the steering angle θs increases. Therefore, the steering speed ω that is the derivative of the steering angle θs is positive as well. Thus, when the steering wheel 11 is turned, the value obtained by multiplying the steering torque Th and the steering speed ω together is positive. In this case, the phase of the target pinion angle θ2* is advanced by adding the compensation amount θc to the target steering angle θ1* while setting the gain G to a positive value (for example, "+1") under the assumption that the steering wheel 11 is turned. When the steering wheel 11 is turned, the phase of the target pinion angle θ2* is delayed relative to the steering operation for the steering wheel 11 by the amount corresponding to the twist of the torsion bar 34a, but the phase of the target pinion angle θ2* can be compensated appropriately by advancing the phase of the target pinion angle θ2* by the compensation amount θc.

When the returning operation in the leftward direction is performed after the turning operation in the rightward direction, the steering torque Th may remain positive though the steering angle θs decreases. At this time, the steering torque Th is positive, but the steering speed ω is negative. Therefore, the value obtained by multiplying the steering torque Th and the steering speed ω together is negative. In this case, the phase of the target pinion angle θ2* is advanced by subtracting the compensation amount θc from the target steering angle θ1* while setting the gain G to a negative value (for example, "−1") under the assumption that the steering wheel 11 is returned. When the steering wheel 11 is returned, the phase of the target pinion angle θ2* is delayed relative to the returning operation for the steering wheel 11 by the amount corresponding to the twist of the torsion bar 34a, but the phase of the target pinion angle θ2* can be compensated appropriately by advancing the phase of the target pinion angle θ2* by the compensation amount θc.

During the turning operation in the leftward direction (for example, when the steering wheel 11 is steered further in the leftward direction after the returning operation in the leftward direction), both the steering torque Th and the steering angle θs increase on the negative side. Therefore, both the steering torque Th and the steering speed ω are negative, and the value obtained by multiplying the steering torque Th and the steering speed ω together is positive. In this case, the phase of the target pinion angle θ2* is advanced by adding the compensation amount θc to the target steering angle θ1* while setting the gain G to a positive value (for example, "+1") under the assumption that the steering wheel 11 is turned.

When the returning operation in the rightward direction is performed after the turning operation in the leftward direction, the steering torque Th may be negative though the steering angle θs increases toward the neutral position of the steering wheel 11. At this time, the steering torque Th is negative, but the steering speed ω is positive. Therefore, the value obtained by multiplying the steering torque Th and the steering speed ω together is negative. In this case, the phase of the target pinion angle θ2* is advanced by subtracting the compensation amount θc from the target steering angle θ1* while setting the gain G to a negative value (for example, "−1") under the assumption that the steering wheel 11 is returned.

As described above, the steering condition of the steering wheel 11 as to whether the steering wheel 11 is turned or returned can be determined appropriately based on whether the value obtained by multiplying the steering torque Th and the steering speed ω together is positive or negative. The steering condition of the steering wheel 11 is determined appropriately owing also to the use of the steering torque Th that changes earlier than the rotation angle θs0 in response to the steering operation for the steering wheel 11. The phase of the target pinion angle θ2* can be compensated appropriately based on whether the steering wheel 11 is turned or returned.

As a comparative example, there is a possibility that determination as to which of the turning operation and the returning operation is performed cannot be made appropriately based only on the steering torque Th or the steering speed ω.

(3) When the phase is not compensated by the torsional stiffness control circuit 70, the phase of the target pinion angle θ2* deviates by the amount corresponding to the torsion angle θtw relative to the steering operation for the steering wheel 11. In this embodiment, the absolute value of the gain G can be adjusted within the range smaller than "1". Therefore, it is possible to adjust the degree to which the torsion angle θtw that is the deviation amount of the phase is reflected in the compensation of the phase of the target pinion angle θ2*. By adjusting the gain G between "+1" and "−1" based on the power generated to twist the torsion bar 34a through the steering operation for the steering wheel 11, it is possible to change the degree of adjustment of the phase of the target pinion angle θ2* to the steering operation for the steering wheel 11. Accordingly, adjustment can be performed so as to suppress the deterioration in the steering feel of the steering wheel 11.

Description is given of a steering control apparatus according to a second embodiment that is applied to a steer-by-wire type steering system. The description is mainly given of differences from the first embodiment. In the second embodiment, the gain calculation circuit 72 of the torsional stiffness control circuit 70 calculates various vehicle condition gains based on the traveling condition of the vehicle in addition to the gain G determined based on the power generated to twist the torsion bar 34a through the steering operation for the steering wheel 11. Thus, the phase of the target pinion angle θ2* is adjusted to the steering operation for the steering wheel 11 based also on the traveling condition of the vehicle.

Figure 6:
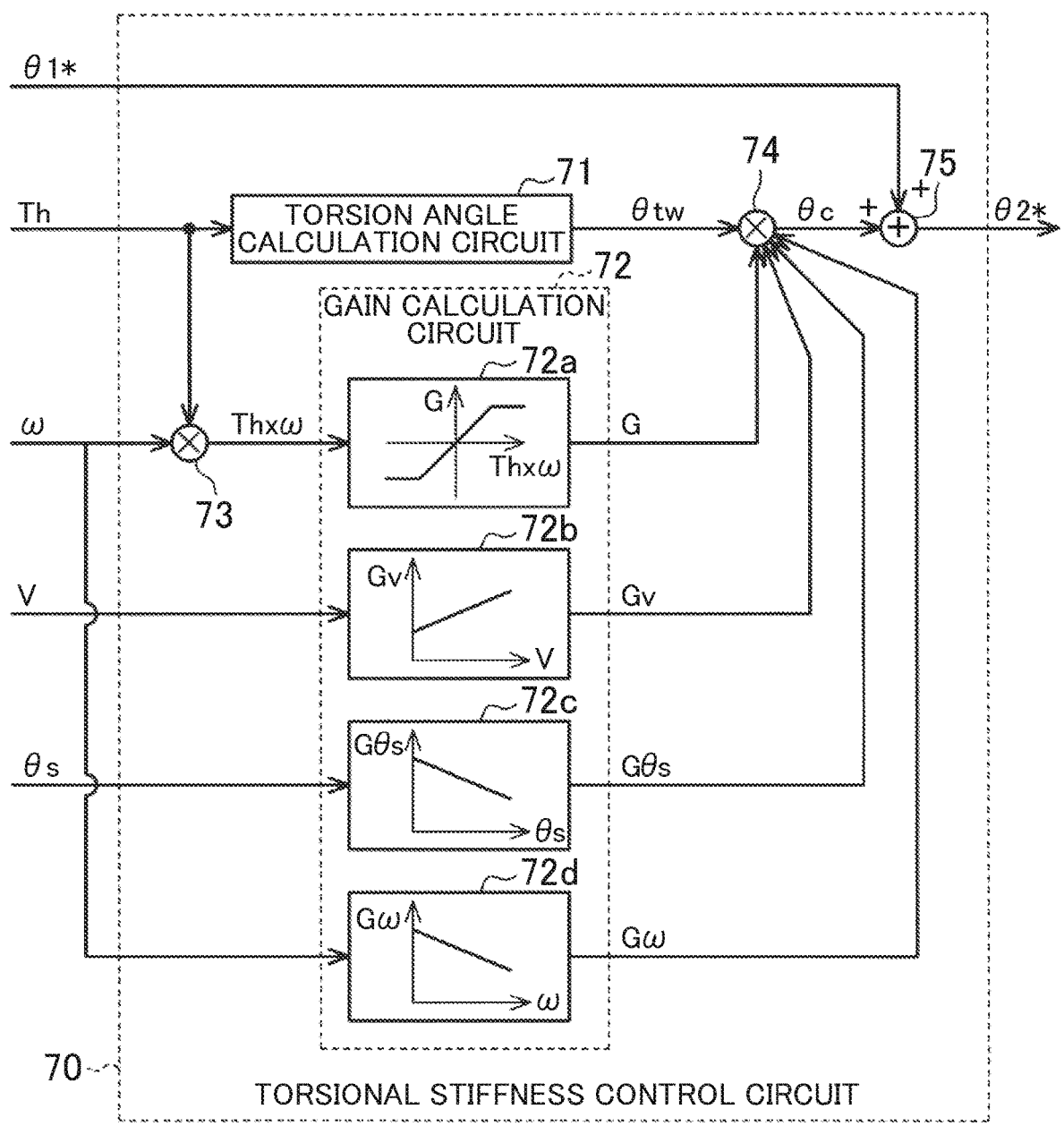
FIG. 6 is a control block diagram of a torsional stiffness control circuit of a second embodiment.

As illustrated in FIG. 6, the gain calculation circuit 72 includes the basic gain calculation circuit 72a, a vehicle speed gain calculation circuit 72b, a steering angle gain calculation circuit 72c, and a steering speed gain calculation circuit 72d. The vehicle speed gain calculation circuit 72b, the steering angle gain calculation circuit 72c, and the steering speed gain calculation circuit 72d function as a traveling condition gain calculation circuit.

The vehicle speed gain calculation circuit 72b calculates a vehicle speed gain Gv having a larger value as the vehicle speed V increases. When the vehicle speed V is "0", the vehicle speed gain calculation circuit 72b sets the value of the vehicle speed gain Gv to a value larger than "0".

The steering angle gain calculation circuit 72c calculates a steering angle gain Gθs having a smaller value as the steering angle θs increases. When the steering angle θs is "0", the steering angle gain calculation circuit 72c sets the value of the steering angle gain Gθs to a value larger than "0".

The steering speed gain calculation circuit 72d calculates a steering speed gain Gω having a smaller value as the steering speed ω increases. When the steering speed ω is "0", the steering speed gain calculation circuit 72d sets the value of the steering speed gain Gω to a value larger than "0".

The multiplication circuit 74 of the torsional stiffness control circuit 70 calculates the compensation amount θc by multiplying the torsion angle θtw calculated by the torsion angle calculation circuit 71 by the gain G, the vehicle speed gain Gv, the steering angle gain Gθs, and the steering speed gain Gω.

The addition circuit 75 calculates the target pinion angle θ2* having a compensated phase by adding the compensation amount θc calculated by the multiplication circuit 74 to the target steering angle θ1* calculated by the target steering angle calculation circuit 52.

Actions and effects of this embodiment are described.

(4) Various traveling condition gains (Gv, Gθs, and Gω) increase or decrease depending on the traveling condition of the vehicle. Therefore, the compensation amount θc increases or decreases. Thus, the phase of the target pinion angle θ2* relative to the steering operation for the steering wheel 11 can be changed based on the traveling condition of the vehicle in addition to the power generated to twist the torsion bar 34a through the steering operation for the steering wheel 11. Accordingly, the response of turning of the steered wheels 17 and 17 to the steering operation for the steering wheel 11 can be adjusted based on the traveling condition of the vehicle.

(5) The vehicle speed V, the steering angle θs, the steering speed ω, and the like are values affected by the traveling condition of the vehicle. That is, the vehicle speed V has a larger value as the vehicle is traveling at a higher speed. The steering angle θs has a larger value when the vehicle makes a wide turn. The steering speed ω increases when the steering wheel 11 is steered forcefully. Thus, it is possible to change the degree of adjustment of the phase of the target pinion angle θ2* to the turning operation or the returning operation for the steering wheel 11 based on the vehicle speed V, the steering angle θs, the steering speed ω, and the like. Accordingly, adjustment can be performed so as to suppress the deterioration in the steering feel of the steering wheel 11.

Description is given of a steering control apparatus according to a third embodiment that is applied to a steer-by-wire type steering system. The description is mainly given of differences from the first embodiment. In the third embodiment, the gain calculation circuit 72 of the torsional stiffness control circuit 70 adjusts the phase of the target pinion angle $\theta 2^*$ to the steering operation for the steering wheel 11 based on a drive mode selected by the driver. That is, in the third embodiment, the steering feel of the steering wheel 11 is switched based on the drive mode selected by the driver.

Figure 7:
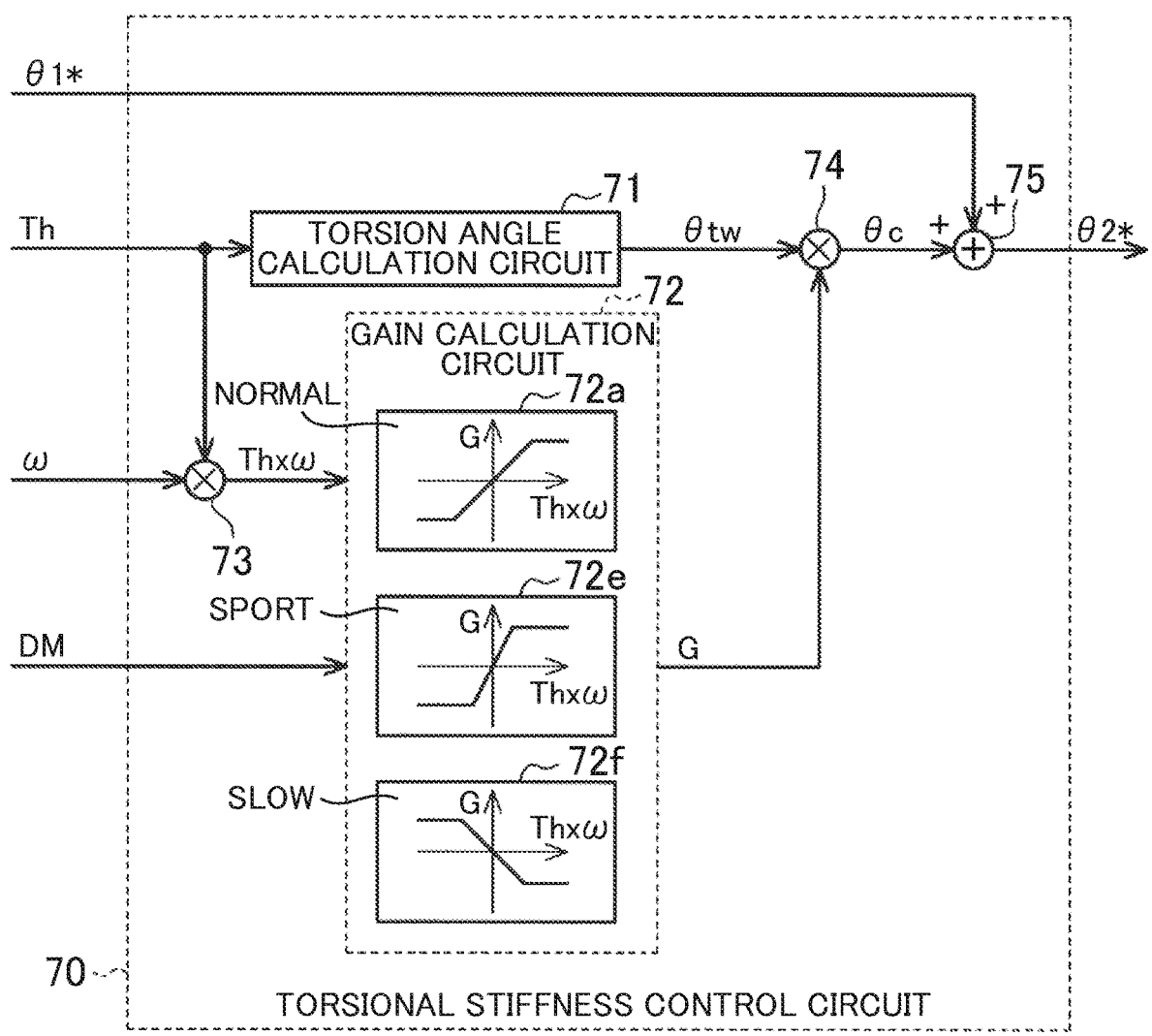
FIG. 7 is a control block diagram of a torsional stiffness control circuit of a third embodiment.

As illustrated in FIG. 7, the gain calculation circuit 72 includes the basic gain calculation circuit 72a, a first change gain calculation circuit 72e, and a second change gain calculation circuit 72f. In this case, the basic gain calculation circuit 72a, the first change gain calculation circuit 72e, and the second change gain calculation circuit 72f function as a change gain calculation circuit. The gain calculation circuit 72 acquires a drive mode DM selected by the driver, and the value obtained by multiplying the steering torque Th and the steering speed $\omega$ of the steering wheel 11 together. A switch configured to change the response of the vehicle is mounted on the vehicle. The drive mode DM is input to the gain calculation circuit 72 based on an operation status (instruction status) of the switch that is set by the driver. The gain calculation circuit 72 selects one calculation circuit out of the basic gain calculation circuit 72a, the first change gain calculation circuit 72e, and the second change gain calculation circuit 72f based on the input drive mode DM, and the selected calculation circuit calculates a gain G based on the value obtained by multiplying the steering torque Th and the steering speed $\omega$ of the steering wheel 11 together. The basic gain calculation circuit 72a corresponds to a normal mode. The first change gain calculation circuit 72e corresponds to a sport mode in which the response of the vehicle is quicker than that in the normal mode. The second change gain calculation circuit 72f corresponds to a slow mode in which the response of the vehicle is slower than that in the normal mode.

When the gain G falls within the range between "+1" and "−1", the change amount of the gain G relative to the value obtained by multiplying the steering torque Th and the steering speed $\omega$ together is set larger in the first change gain calculation circuit 72e than the basic gain calculation circuit 72a. The first change gain calculation circuit 72e sets the gain G to "+1" when the value obtained by multiplying the steering torque Th and the steering speed $\omega$ together is positive and larger than a threshold which is positive and whose absolute value is smaller than that of the threshold W0, and sets the gain G to "−1" when the value obtained by multiplying the steering torque Th and the steering speed $\omega$ together is negative and smaller than a threshold which is negative and whose absolute value is smaller than that of the threshold −W0. Thus, the first change gain calculation circuit 72e can advance the phase of the target pinion angle $\theta 2^*$ relative to the steering operation for the steering wheel 11 by the compensation amount $\theta c$ similarly to the basic gain calculation circuit 72a.

In the second change gain calculation circuit 72f, the relationship of the gain G to the value obtained by multiplying the steering torque Th and the steering speed $\omega$ together is reversed as compared to the basic gain calculation circuit 72a. That is, the second change gain calculation circuit 72f sets the gain G to "−1" when the value obtained by multiplying the steering torque Th and the steering speed $\omega$ together is larger than the threshold W0, and sets the gain G to "+1" when the value obtained by multiplying the steering torque Th and the steering speed $\omega$ together is smaller than the threshold −W0. Thus, the second change gain calculation circuit 72f can delay the phase of the target pinion angle $\theta 2^*$ relative to the steering operation for the steering wheel 11 by the compensation amount $\theta c$.

The multiplication circuit 74 of the torsional stiffness control circuit 70 calculates the compensation amount $\theta c$ by multiplying the torsion angle $\theta tw$ calculated by the torsion angle calculation circuit 71 by the gain G serving as a change gain. The addition circuit 75 calculates the target pinion angle $\theta 2^*$ having a compensated phase by adding the compensation amount $\theta c$ calculated by the multiplication circuit 74 to the target steering angle $\theta 1^*$ calculated by the target steering angle calculation circuit 52.

Actions and effects of this embodiment are described.

(6) The compensation amount $\theta c$ is increased or decreased such that the driver changes the drive mode of the vehicle by operating the switch for changing the response of the vehicle. When the driver selects the sport mode, the response of turning of the steered wheels 17 and 17 to the steering operation for the steering wheel 11 can be made quicker than that in the normal mode by advancing the phase of the target pinion angle $\theta 2^*$. When the driver selects the slow mode, the response of turning of the steered wheels 17 and 17 to the steering operation for the steering wheel 11 can be made slower than that in the normal mode by further delaying the phase of the target pinion angle $\theta 2^*$ in a state in which the phase is delayed relative to the steering operation for the steering wheel 11. Accordingly, adjustment can be performed so as to suppress the deterioration in the steering feel of the steering wheel. Further, the flexibility of the adjustment of the steering feel can be increased, which can contribute to a wider variety of steering feels.

The embodiments may be modified as follows. The embodiments described above and other embodiments described below may be combined without causing any technical contradiction. In the second embodiment, the vehicle speed gain Gv, the steering angle gain G$\theta$s, and the steering speed gain G$\omega$ are used as the traveling condition gain that increases or decreases depending on the traveling condition of the vehicle. The present invention is not limited to this case. For example, at least one of the vehicle speed gain Gv, the steering angle gain G$\theta$s, and the steering speed gain G$\omega$ may be used as the traveling condition gain. The traveling condition gain is not limited to the vehicle speed gain Gv, the steering angle gain G$\theta$s, and the steering speed gain G$\omega$. For example, the traveling condition gain may be a gain that increases or decreases depending on other traveling conditions such as a lateral acceleration of the vehicle or an acceleration that is a derivative of the vehicle speed V. The same may apply to the first embodiment.

In the third embodiment, three modes that are the sport mode, the normal mode, and the slow mode can be selected as the drive mode. Four or more modes that differ in terms of the response of turning of the steered wheels 17 and 17 to the steering operation for the steering wheel 11 may be selected. Alternatively, two modes may be selected.

In the first and second embodiments, the gain calculation circuit 72 may include a change gain calculation circuit configured to acquire an external input such as the drive mode DM generated by operating the switch provided in the vehicle and perform multiplication by using a gain calculated based on the external input. In this case, a value obtained by multiplying the gain G calculated by the basic gain calculation circuit 72a by the gain calculated by the change gain calculation circuit is input to the multiplication circuit 74. The gain to be calculated by the change gain calculation circuit is calculated within a range between "+1" and "−1". The external input itself may serve as the change gain.

In the third embodiment, the drive mode DM is switched based on the operation status of the switch. For example, the drive mode DM may be switched based on an instruction status of voice.

In the second embodiment, the vehicle speed gain calculation circuit 72b calculates the vehicle speed gain Gv having a larger value as the vehicle speed V increases. The present invention is not limited to this case. The vehicle speed gain calculation circuit 72b may calculate a vehicle speed gain Gv having a smaller value as the vehicle speed V increases.

The vehicle speed gain calculation circuit 72b may calculate a negative vehicle speed gain Gv when the vehicle speed V is low, and may calculate a positive vehicle speed gain Gv when the vehicle speed V is high. Alternatively, the vehicle speed gain calculation circuit 72b may calculate a positive vehicle speed gain Gv when the vehicle speed V is low, and may calculate a negative vehicle speed gain Gv when the vehicle speed V is high. Through the adjustment of the vehicle speed gain Gv, the phase of the target pinion angle $\theta 2^*$ can be advanced or delayed relative to the turning operation or the returning operation for the steering wheel 11. Accordingly, adjustment can be performed so as to suppress the deterioration in the steering feel of the steering wheel 11.

In the embodiments, the gain calculation circuit 72 may calculate the gain based on a calculation map indicating a relationship of the gain to a plurality of input values. For example, in the second embodiment, the gain calculation circuit 72 may calculate one traveling condition gain based on a three or higher dimensional calculation map indicating a relationship between the gain and each of the vehicle speed V, the steering angle $\theta s$, and the steering speed $\omega$. Alternatively, the gain calculation circuit 72 may calculate one gain based on the steering torque Th, the steering speed $\omega$, the vehicle speed V, the steering angle $\theta s$, and the drive mode DM.

In the embodiments, the torsional stiffness control circuit 70 compensates the phase of the target pinion angle $\theta 2^*$ by adding the compensation amount $\theta c$ calculated by the multiplication circuit 74 to the target steering angle $\theta 1^*$. The present invention is not limited to this case. For example, the torsional stiffness control circuit 70 may compensate the phase of the target pinon angle $\theta 2^*$ by calculating a gain based on the steering torque Th, the steering speed $\omega$, and the torsion angle $\theta tw$ and multiplying the target steering angle $\theta 1^*$ by the gain.

In the embodiments, when the value obtained by multiplying the steering torque Th and the steering speed $\omega$ together is present between the threshold W0 and the threshold −W0, the basic gain calculation circuit 72a only needs to calculate a gain G in a manner to obtain a larger gain G when the absolute value of the value obtained by multiplying the steering torque Th and the steering speed $\omega$ together is large than that in a case where the absolute value is small. When the value obtained by multiplying the steering torque Th and the steering speed $\omega$ together is present between the threshold W0 and the threshold −W0, the basic gain calculation circuit 72a may calculate a gain G that increases stepwise as the value obtained by multiplying the steering torque Th and the steering speed $\omega$ together increases. The basic gain calculation circuit 72a may switch the positive or negative sign of the gain G based on whether the value obtained by multiplying the steering torque Th and the steering speed $\omega$ together is positive or negative.

In the embodiments, the basic gain calculation circuit 72a calculates the gain G based on the value obtained by multiplying the steering torque Th and the steering speed $\omega$ together, which is the power generated to twist the torsion bar 34a through the steering operation for the steering wheel 11. The present invention is not limited to this case. For example, the basic gain calculation circuit 72a may calculate the gain G by using a value obtained by multiplying together the steering angle $\theta s$ and a steering torque derivative, which is a derivative of the steering torque Th, as the power generated to twist the torsion bar 34a through the steering operation for the steering wheel 11. Alternatively, the basic gain calculation circuit 72a may calculate the gain G by using the sum of the value obtained by multiplying the steering torque Th and the steering speed $\omega$ together and the value obtained by multiplying the steering torque derivative and the steering angle $\theta s$ together as the power generated to twist the torsion bar 34a through the steering operation for the steering wheel 11. That is, the basic gain calculation circuit 72a may calculate the gain G by using any value as long as the value is related to the power generated to twist the torsion bar 34a through the steering operation for the steering wheel 11.

In the embodiments, the gain calculation circuit 72 is provided. The present invention is not limited to this case. For example, there may be provided a switching circuit configured to change the degree of adjustment of the phase of the target pinion angle $\theta 2^*$ based on whether the value obtained by multiplying the steering torque Th and the steering speed $\omega$ together is positive or negative.

In the embodiments, the target steering reaction force calculation circuit 51 may calculate the target steering reaction force T1* based only on the steering torque Th detected by the torque sensor 34.

In the embodiments, the target pinion angle $\theta 2^*$ is the target value of the pinion angle $\theta p$ of the pinion shaft 44. The present invention is not limited to this case. For example, the target pinion angle $\theta 2^*$ may be a target value of a pinion angle of the pinion shaft 13, or may be a target value of the steered angle $\theta t$ of each of the steered wheels 17 and 17. That is, the target pinion angle $\theta 2^*$ may be any value as long as the value is a target value of a value convertible to the steered angle $\theta t$ of each of the steered wheels 17 and 17. When the target pinion angle $\theta 2^*$ is the target value of the pinion angle of the pinion shaft 13, the pinion angle feedback control circuit 62 executes angle feedback control so that the pinion angle of the pinion shaft 13 follows the target pinion angle $\theta 2^*$. When the target pinion angle $\theta 2^*$ is the target value of the steered angle $\theta t$ of each of the steered wheels 17 and 17, the pinion angle feedback control circuit 62 executes angle feedback control so that the steered angle of each of the steered wheels 17 and 17 follows the target pinion angle $\theta 2^*$ serving as a steered angle command value.

In the embodiments, the rotation angle sensor 33 detects the rotation angle $\theta s0$ of the reaction motor 31. The present invention is not limited to this case. For example, the rotation angle sensor 33 may detect a rotation angle of the part of the steering shaft 12 that is opposite to the steering wheel 11 with respect to the torsion bar 34a. That is, the rotation angle sensor 33 may be any sensor as long as the sensor detects a value convertible to the rotation angle $\theta s0$ of the reaction motor 31.

In the embodiments, the rotation angle sensor 43 detects the rotation angle $\theta t0$ of the steering operation motor 41. The present invention is not limited to this case. For example, the rotation angle sensor 43 may detect the rotation angle of the pinion shaft 44, or may detect the rotation angle of the pinion shaft 13. That is, the rotation angle sensor 43 may be any sensor as long as the sensor detects a value convertible to the rotation angle of the pinion shaft 13, in other words, a value convertible to the rotation angle θt0 of the steering operation motor 41.

The rotational force of the steering operation motor 41 is transmitted to the steering operation shaft 15 via the second rack and pinion mechanism 45. The present invention is not limited to this case. That is, any structure may be employed as long as the rotational force of the steering operation motor 41 can be transmitted to the steering operation shaft 15. For example, the steering operation motor 41 may be arranged coaxially with the steering operation shaft 15, or may be arranged in parallel to the steering operation shaft 15.

In the embodiments, the steering control apparatus 50 is applied to the steer-by-wire type steering system 1 including the clutch 20, but may be applied to a steer-by-wire type steering system 1 without the clutch 20.

The pinion angle calculation circuit 61 may calculate a pinion angle that is an actual rotation angle of the pinion shaft 13 based on the rotation angle θt0 detected by the rotation angle sensor 43. In this case, the target pinion angle θ2* is a target value of the pinion angle of the pinion shaft 13.

In the embodiments, the steering control apparatus 50 is applied to the steer-by-wire type steering system 1, but may be applied to an electric power steering system including a variable steering angle ratio mechanism configured to change a steering angle ratio that is a ratio between the steering angle θs of the steering wheel 11 and the steered angle θt of each of the steered wheels 17 and 17. In this case, the variable steering angle ratio mechanism provided on the steering shaft 12 functions as an angle varying apparatus configured to vary an angle relationship between a part of the steering shaft 12 that is closer to the steering wheel 11 with respect to the variable steering angle ratio mechanism and a part of the steering shaft 12 that is opposite to the steering wheel 11 with respect to the variable steering angle ratio mechanism. For example, the target pinion angle θ2* is a target value of a rotation angle of the part of the steering shaft 12 that is opposite to the steering wheel 11 with respect to the variable steering angle ratio mechanism.

What is claimed is:

1. A steering control apparatus configured to control a steering system including:
   a steering apparatus including a steering wheel to be steered by a driver;
   a steering operation apparatus configured to turn a steered wheel in response to a steering operation for the steering wheel by the driver;
   an angle varying apparatus coupling a part of a steering shaft on a side of the steering apparatus and a part of the steering shaft on a side of the steering operation apparatus, the angle varying apparatus being configured to vary an angular relationship between the part of the steering shaft on the side of the steering apparatus and the part of the steering shaft on the side of the steering operation apparatus, the steering shaft being provided over the steering apparatus and the steering operation apparatus;
   a torque sensor configured to detect a steering torque based on a torsion amount of a torsion bar provided at the part of the steering shaft on the side of the steering apparatus; and
   a motor connected to the steering operation apparatus, the motor being configured to turn the steered wheel based on the steering torque,
   the steering control apparatus comprising:
   a follow angle calculation circuit configured to calculate a follow angle that follows an angle command value that is a target value of a value convertible to a steered angle of the steered wheel based on an angle detected by a rotation angle sensor and convertible to a rotation angle of a part of the steering shaft that is opposite to the steering wheel with respect to the torsion bar;
   a command value calculation circuit configured to calculate a command value for driving the motor in response to the steering operation for the steering wheel, the command value calculation circuit being configured to calculate the angle command value as the command value;
   a compensation circuit configured to compensate the command value so as to change a phase of the command value relative to the steering operation for the steering wheel based on power generated to twist the torsion bar through the steering operation for the steering wheel, the compensation circuit being configured to compensate the angle command value calculated by the command value calculation circuit so as to change a phase of the angle command value; and
   an angle feedback control circuit configured to calculate a current command value that is a target value of a current to be applied to the motor by executing angle feedback control so that the follow angle calculated by the follow angle calculation circuit follows the angle command value compensated by the compensation circuit.

2. The steering control apparatus according to claim 1, further comprising a steering angle calculation circuit configured to calculate a steering angle of the steering wheel based on the angle obtained by the rotation angle sensor, wherein
   the compensation circuit is configured to use, as the power generated to twist the torsion bar, at least one of a product of the steering torque and a steering speed of the steering wheel and a product of the steering angle of the steering wheel and a steering torque derivative that is a derivative of the steering torque.

3. The steering control apparatus according to claim 2, wherein the compensation circuit includes:
   a torsion angle calculation circuit configured to calculate a torsion angle based on the steering torque detected by the torque sensor, the torsion angle is the torsion amount of the torsion bar and is a difference between a rotation angle of a part of the steering shaft that is closer to the steering wheel with respect to the torsion bar and the rotation angle of the part of the steering shaft that is opposite to the steering wheel with respect to the torsion bar;
   a gain calculation circuit configured to calculate, based on the power generated to twist the torsion bar, a gain having a positive value or a negative value so as to change the phase of the command value relative to the steering operation for the steering wheel;
   a multiplication circuit configured to calculate a compensation value for compensating the phase of the command value by multiplying the torsion angle by the gain; and an addition circuit configured to calculate the command value by adding the compensation value to the command value.

4. The steering control apparatus according to claim 3, wherein:
the gain calculation circuit includes a traveling condition gain calculation circuit configured to calculate a traveling condition gain that increases or decreases depending on a traveling condition of a vehicle so as to change the phase of the command value relative to the steering operation for the steering wheel, and
the compensation circuit is configured to use, as the gain, a value obtained by multiplying the gain by the traveling condition gain.

5. The steering control apparatus according to claim 3, wherein:
the gain calculation circuit includes a change gain calculation circuit configured to calculate a change gain that is set based on an instruction status for changing a response of a vehicle so as to change the phase of the command value relative to the steering operation for the steering wheel, and
the compensation circuit is configured to use the change gain as the gain.

6. The steering control apparatus according to claim 3, wherein the gain calculation circuit is configured to set the gain between +1 and −1.

* * * * *